United States Patent [19]

Groendal et al.

[11] Patent Number: 5,080,384
[45] Date of Patent: Jan. 14, 1992

[54] BICYCLE FRAME

[75] Inventors: Mark L. Groendal, Kentwood, Mich.; Robert E. Shook, Huntington Beach, Calif.

[73] Assignee: Greendale Bicycle Company, Grand Rapids, Mich.

[21] Appl. No.: 580,607

[22] Filed: Sep. 11, 1990

[51] Int. Cl.⁵ ............................................ B62K 19/02
[52] U.S. Cl. ................... 280/275; 280/281.1; 280/283
[58] Field of Search .............. 280/274, 275, 281.1, 280/283, 288.3, 288.1, 288.2; 296/205

[56] References Cited

U.S. PATENT DOCUMENTS

| | | | |
|---|---|---|---|
| 433,172 | 7/1890 | Jett | 280/251 |
| 441,649 | 12/1890 | Dunlop | 280/275 |
| 453,514 | 6/1881 | Sheir | 280/275 |
| 463,710 | 11/1891 | Mathews | 280/275 |
| 591,306 | 10/1897 | Tolson | 280/283 |
| 602,034 | 5/1898 | Murphy | 280/266 |
| 701,967 | 6/1902 | Titus | 280/283 |
| 1,045,025 | 11/1912 | Heroguez | 280/283 |
| 3,990,717 | 11/1976 | Best | 280/278 |
| 4,102,439 | 7/1978 | Calderazzo | 188/24 |
| 4,119,326 | 10/1978 | Porter | 280/236 |
| 4,162,797 | 7/1979 | McBride | 280/275 |
| 4,202,561 | 5/1980 | Yonkers | 280/278 |
| 4,293,141 | 10/1981 | Brilando | 280/274 |
| 4,484,756 | 11/1984 | Takamiya et al. | 280/281.1 |
| 4,669,747 | 6/1987 | Groendal | 280/283 |
| 4,792,150 | 12/1988 | Groendal et al. | 280/275 |
| 4,902,160 | 2/1990 | Jeng | 280/281.1 |

FOREIGN PATENT DOCUMENTS

| | | |
|---|---|---|
| 110943 | 5/1927 | Austria . |
| 672642 | 10/1963 | Canada . |
| 839312 | 6/1938 | France . |
| 12901 | of 1886 | United Kingdom . |
| 0608223 | 9/1948 | United Kingdom ............ 280/281.1 |

Primary Examiner—Charles A. Marmor
Assistant Examiner—Victor E. Johnson
Attorney, Agent, or Firm—Price, Heneveld, Cooper, DeWitt & Litton

[57] ABSTRACT

A bicycle frame having a front frame portion with a rearwardly extending crossbar of elliptical cross-section, the major elliptical axis of which is vertically oriented. The rear of the crossbar is gradually tapered by flattening and widening into a substantially equilateral triangular configuration and then sharply reduced to an oblong horizontally extending opening where it is connected to a rear frame by a flexible spring connection.

8 Claims, 4 Drawing Sheets

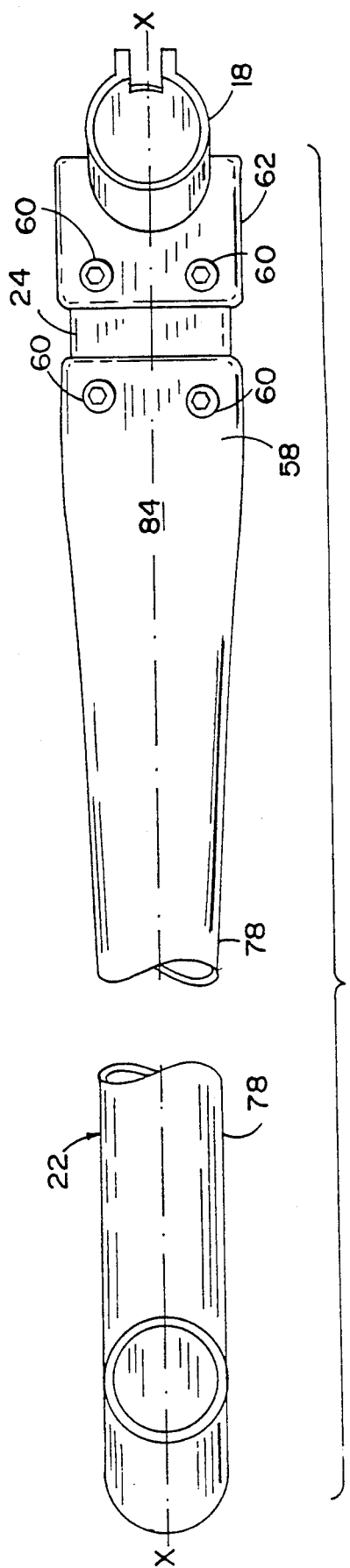
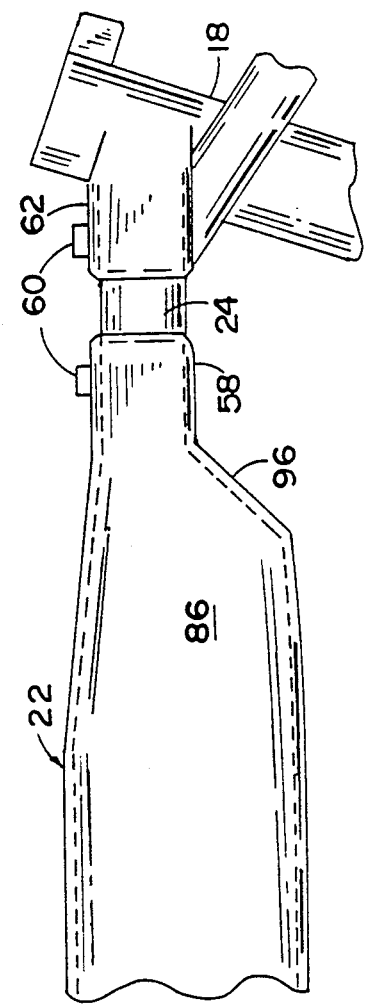
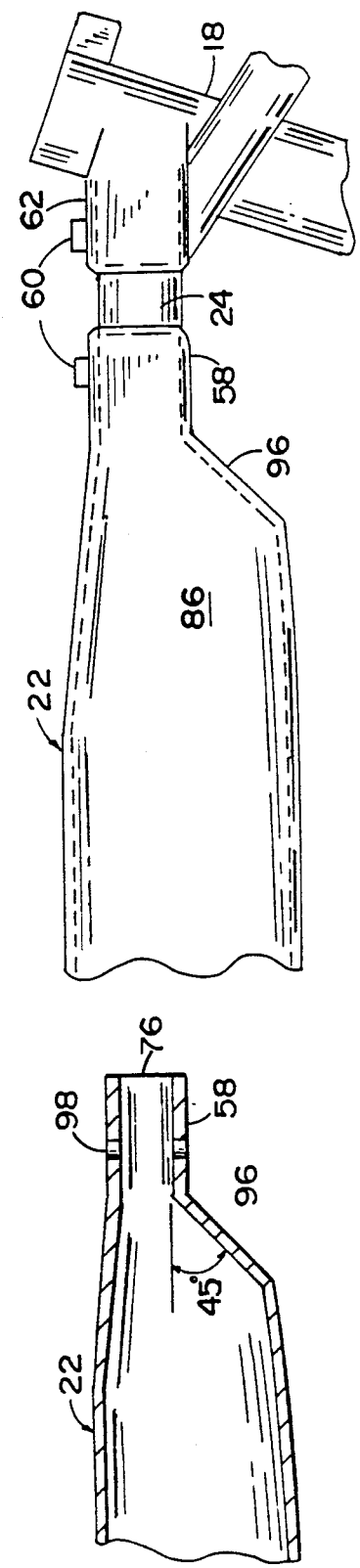
FIG. 7
FIG. 8
FIG. 6

BICYCLE FRAME

BACKGROUND OF THE INVENTION

The present invention relates to an improvement in a revolutionary new type of bicycle disclosed and claimed in U.S. patent application Ser. No. 266,181, filed May 22, 1981, now U.S. Pat. No. 4,669,747. Conventional bicycles comprise a rigid frame including a central post in which a seat is mounted, a top crossbar rigidly connected to the central post near the top thereof and extending forwardly to a front journal tube in which the separate front wheel frame or fork is rotatably journaled, and a bottom crossbar which extends upwardly and forwardly from the bottom of the center post, usually from the crank shaft hub mounted at the bottom of the central post, to the front journal hub at a point just below the top crossbar. The center post, top crossbar and bottom crossbar define the three legs of a rigid structural triangle.

In the revolutionary new bicycle of U.S. Pat. No. 4,669,747 the foregoing rigid, triangular-shaped frame member is eliminated. The bottom crossbar is eliminated altogether and provisions for a flexible spring connection between the top crossbar and the center post are made. One or more tension cables extend from the front portion of the frame, near the front of the top crossbar, downwardly to a point on the rear portion of the frame near the bottom of the center post. This construction is especially well adapted to dirt bike racing in that the frame itself is designed to absorb the shocks of rough riding. Further, when pedalling torque spreads the frame, the springs at the tension cable ends are compressed. At the end of the pedal stroke, the spring relaxes and drives the crank upward for an extra kick when the pedals are on the upstroke part of their travel.

A problem with this construction was that the front portion of the frame and the front wheel tend to yaw laterally from side to side relative to the rear frame portion as the bicycler pedals. This front yaw problem was solved by including stiffening means integral with the bicycle center post and/or the crossbars as disclosed and claimed in U.S. patent application Ser. No. 54,270, filed May 26, 1987, now U.S. Pat. No. 4,792,150. The stiffening means for the crossbar included a pair of vertically spaced crossbar members and also a flat rigid plate positioned inside each crossbar member and extending a major portion of the length thereof and oriented laterally with respect to longitudinal axis of the frame. In another embodiment, the stiffening means of a crossbar comprised a structure constructed of substantially flat consecutively connected wall portions formed into a box beam.

One problem with the crossbar stiffening means disclosed was that they involved the use of multiple parts which must not only be fitted and assembled with care, but also which add unnecessary weight. Also, with the additional parts, tolerances became critical and manufacturing complexity was increased.

SUMMARY OF THE INVENTION

Surprisingly, we have been able to improve the torsional strength, improve the ease of manufacture, reduce the number of parts, and as a result, reduce the weight and cost of manufacture by making the crossbar out of a single horizontally extending hollow tubular member having a generally elliptical cross-section, the major axis of which is oriented in an imaginary vertical plane at least for a substantial portion of the length of the crossbar. In the preferred embodiment, the hollow tubular member is adapted at a rearward end to receive the flex means and adapted at a forward end to integrally connect with the front frame member.

These and other objects advantages and features of the present invention will be more fully understood and more appreciated by reference to the written specification, claims, and appended drawings.

BRIEF DESCRIPTION OF THE DRAWINGS

FIG. 6 is a fragmentary cross-sectional view taken along the lines VI—VI in FIG. 5;

FIG. 7 is a top view of the frame in FIG. 2;

FIG. 8 is a side elevational view of the frame in FIG. 7;

DESCRIPTION OF THE PREFERRED EMBODIMENTS

Figure 1:
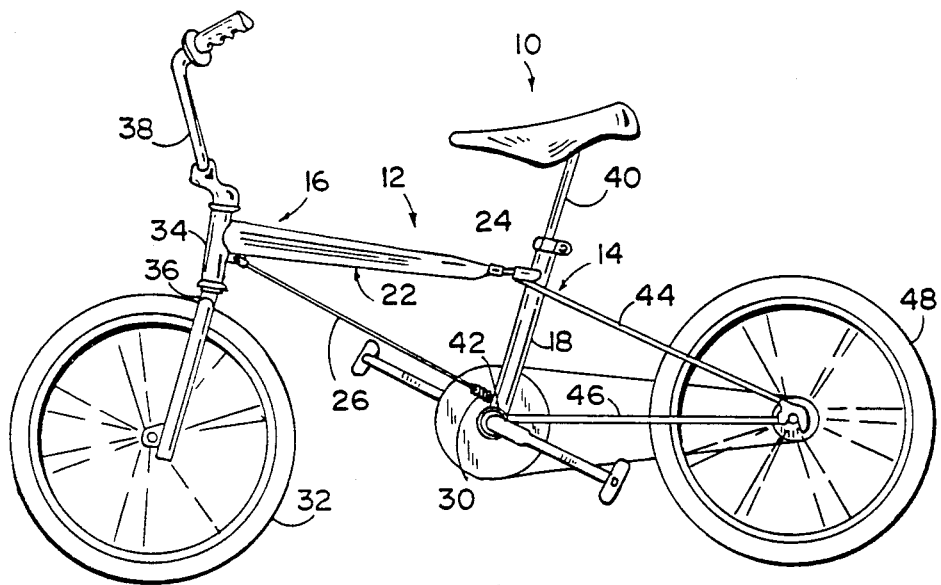
FIG. 1 is a side elevational view of a flexible bicycle of my invention.
Figure 2:
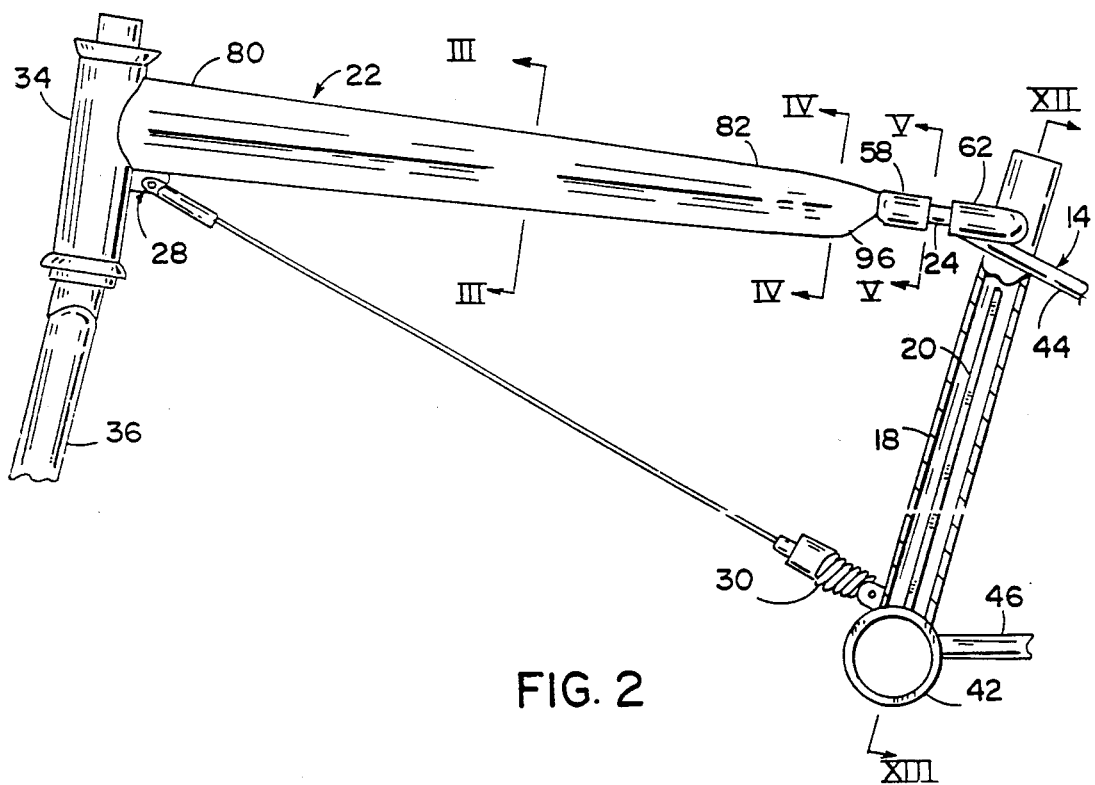
FIG. 2 is an enlarged side elevational view of the frame in FIG. 1.

In the preferred embodiment, flexible bicycle 10 has a frame 12 which is divided into a separate rear frame member 14 and a front frame member 16, wherein crossbar 22 of front frame 16 is made from a hollow generally elliptically shaped tube (FIGS. 1-8). Front and rear frame members 16 and 14 are interconnected at their top by flexible spring plate assembly 24. A forward portion of front frame member 16 is biased downwardly by a tension cable 26 attached to anchor plate 28 on front frame member 16 and tensioned by compression spring 30 mounted at a lower portion of rear frame member 14.

The overall construction of this bike is especially well adapted to dirt bike racing in that the front and rear frame members are allowed limited pivotal movement with respect to each other about a spring plate assembly 24. Shock force, exerted on either the front or rear wheels, is transferred to compression spring 30 through tension cable 26. Thus, when a bump is encountered by front wheel 32, the front frame member 16 will pivot counter clockwise about spring assembly 24 causing compression spring 30 to compress. After the bump, the force stored in spring 30 will dissipate as the spring relaxes. It has also been observed, that the flexible bicycle enhances the performance of a racer, by storing energy in compression spring 30 during the power stroke portion of the pedal rotation. This energy is released through the racer acting upon the pedals during the low power portion of the pedal rotation Yet, the problem of yaw between front and rear frames 14 and 16 is minimized, surprisingly even without the use of a bulky spring plate assembly 24.

Figure 5:
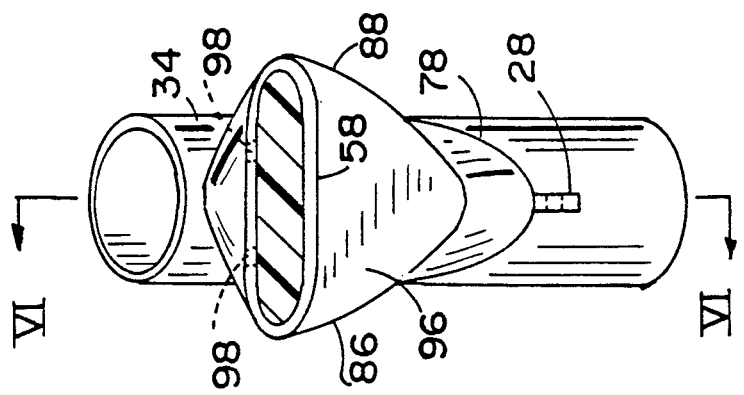
FIG. 5 is a cross-sectional view taken along the lines V—V in FIG. 2.
Figure 4:
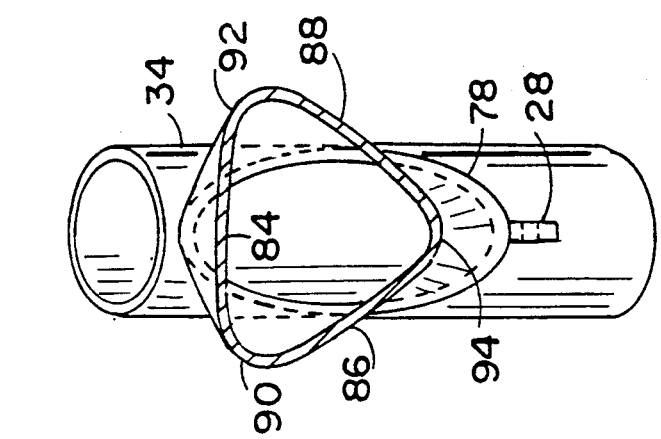
FIG. 4 is a cross-sectional view taken along the lines IV—IV in FIG. 2.
Figure 3:
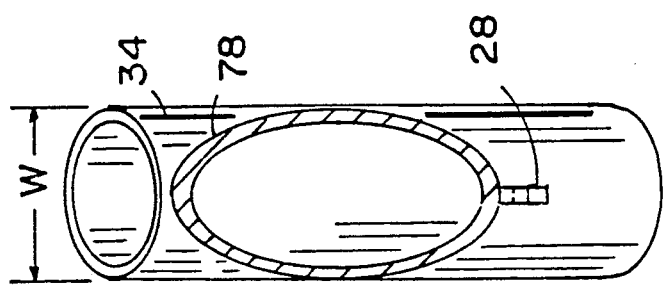
FIG. 3 is a cross-sectional view of the crossbar of the present invention taken along the lines III—III in FIG. 2.
Figure 9:
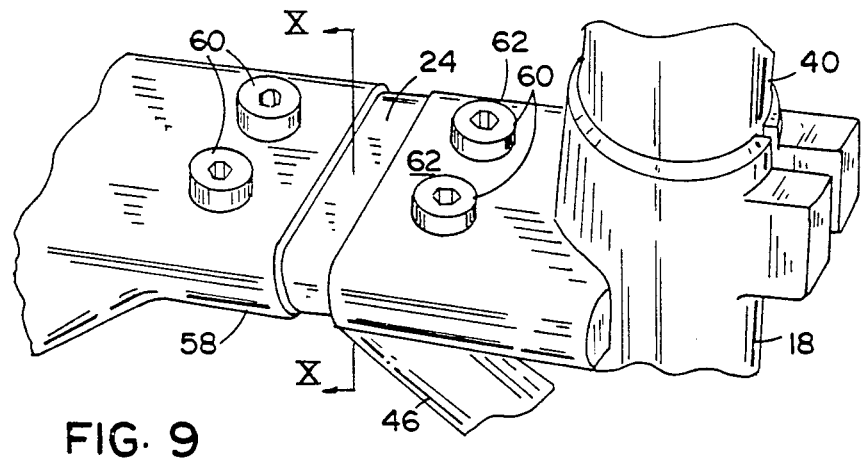
FIG. 9 is an enlarged cutaway perspective view of flex joint shown in the upper right corner of FIG. 2.

Front frame member 16 has a substantially vertically extending front journal tube 34 for journaling front wheel frame or fork member 36, and wheel 32 and handle bars 38 attached to the fork member 36. A horizontal crossbar 22 extends generally horizontally from front journal tube 34 and terminates in a portion connected to spring plate assembly 24. Horizontal crossbar 22 comprises a generally hollow tube of particularly unique design to minimize torsional deflection having primarily an elliptical tubular cross-section but also having multiple cross-sectional shapes as illustrated in FIG. 3-5. Crossbar 22 is rigidly attached at its front to journal tube 34 and at its rear to spring plate assembly 24. An anchor plate 28 attached to the bottom front of crossbar 22 provides an attachment for one end of tension cable 26.

Rear frame member 14 comprises a substantially vertical center post 18 that telescopically receives a seat post 40 at a upper portion thereof. A crank shaft hub 42 at a lower portion of vertical center post 18 journals the pedal crank shaft (not shown). A pair of rearwardly extending connecting members 44 and 46 interconnect the rear wheel 48 with the vertical center post 18.

The forces exerted on front frame member 16 have a tendency to cause bending and torsion forces in the crossbar 22 with respect to generally vertically longitudinal X—X (FIG. 7) which has a tendency to cause crossbar 22 to deflect laterally and to twist longitudinally with respect to the generally vertical, longitudinal plane X—X, surprisingly to a greater degree than they cause twisting and lateral flex in flat spring 24. To resolve this problem, prior art included integral stiffening means within variously configured horizontal crossbars such as was the focus of patent application Ser. No. 54,270 filed May 26, 1987, now U.S. Pat. No. 4,792,150 issued Dec. 20, 1988 to Groendal et al.

Surprisingly, this bending and torsional problem has been resolved in an innovative new way through use of a single uniquely shaped hollow tubular crossbar 22. Improved crossbar 22 (FIG. 3-8) is a single horizontally extending hollow tubular member having a generally elliptical cross-section 78 but with end modifications as required to distribute stresses and to facilitate attachment. The elliptical cross-section 78 (FIG. 3) has a major axis oriented in an imaginary vertical plane for a major portion of the length of crossbar 22, aligned with generally vertical longitudinal plane X—X and extending vertically upwardly. It has been found that the elliptical shape provides the maximum resistance to torsional twist while still permitting the necessary minimum width which must exist between a bicycler's legs. The elliptical shape 78 has a width "W" similar to front journal tube 34 and is integrally welded thereto at front end 80. About two thirds of the distance rearwardly along the longitudinal axis of crossbar 22, the elliptical cross-section 78 of crossbar 22 begins to taper toward the somewhat triangular cross-section shown in FIG. 4. This is so that the rear end portion 82 of crossbar 22 can properly distribute stresses transmitted through spring plate 56 and also properly receive spring plate 26 in spring plate assembly 24 as described below.

Crossbar 22 tapers gradually into a triangular cross-section having curved sides 84, 86, and 88 which join at rounded corners 90, 92 and bottom rounded corner 94 (FIG. 4). Curved sides 84-88 are substantially similar in shape and form to a "rounded" equilateral triangle having rounded corner 94 facing downwardly with curved sides 86 and 88 on either side. About two inches from the rear end 76 of crossbar 22, crossbar 22 is cut at a 45° angle upwardly and rearwardly toward side 84. A triangular plate 96 is welded in place to fill the cut area such that at about one inch from the end of crossbar 22, an oblong horizontally oriented opening is defined by crossbar top wall 84, rounded corners 90 and 92 and the top edge of triangular plate 96. A similarly shaped tube 58 of oblong cross-section and a length of about one inch is welded to crossbar 22 at this point and defines the end of crossbar 22 and serves as a fitting into which the forward end of spring plate assembly 24 is received. Fitting 58 includes holes 98 to receive clamping screws 60, and thus may securely receive and hold spring plate assembly 24. Fitting 58 and triangular plate 96 are welded to crossbar 22 to form a single continuous hollow tubular member which extends from front journal tube 34 to spring plate 24.

The unique shape of crossbar 22 allows crossbar 22 to receive and transmit torsional stress through its longitudinal length to and from spring plate 24, as can best be seen in FIG. 7-8 wherein crossbar 22 is shown assembled to rear frame 14. The transitional area in which crossbar 22 changes from an elliptical shape gradually into a triangular shape and then sharply into a flat oblong horizontal shape suggest which minimizes concentrations of stress and maximizes the resistance to twist of crossbar 22. In this way, crossbar 22 can be made as a single tubular structure without the need for additional strengthening inserts as was used in prior art. This reduces parts required for assembly and reduces assembly time and increases tolerances allowable for production. Further, an increase in torsional strength is experienced. It has been found that crossbar 22 can be made from 4130 chrome alloy high strength steel having a wall thickness of about 0.035 inches.

Figure 12:
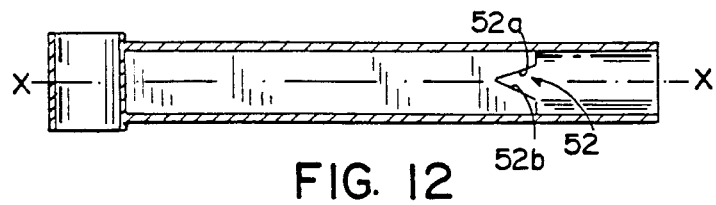
FIG. 12 is a front sectional elevational view taken along lines XII—XII in FIG. 2.
Figure 11:
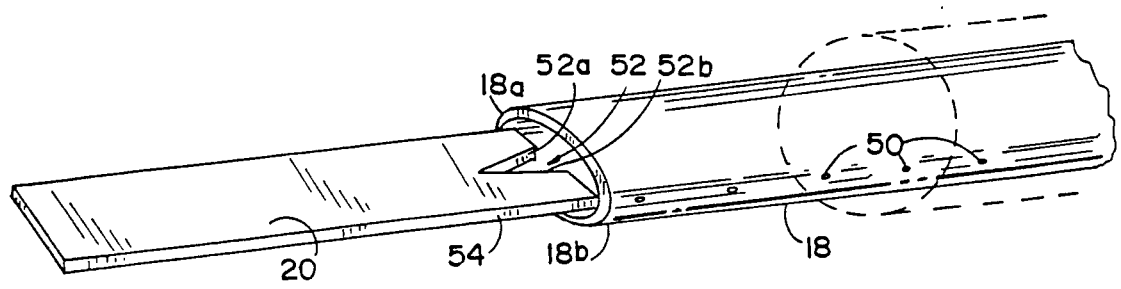
FIG. 11 is a perspective view showing a method of inserting a rigid plate into the vertical center post.

Similarly, the forces exerted on rear frame member 14 have a tendency to cause the vertical center post 18 due to deflect laterally (left and right as viewed in FIG. 12) and to twist longitudinally with respect to a generally vertical, longitudinal plane X—X to a greater degree than the cause flat spring 24 to twist or flex laterally. To resist this lateral bending and twisting force, stiffening means are integrally included in vertical center post 18. As illustrated in FIG. 11 and 12, center post 18 is a hollow tubular member with stiffening means comprising rigid plate 20 integrally assembled within the vertical center post 18 transverse to plane X—X. Plate 20 is an elongated plate with a width size to create an interference fit with opposing wall portions 18A, 18B that define the internal diameter of vertical center post 18. Rigid plate 20 extends in vertical center post 18 from crank shaft hub 42 for a distance approximately 75% of the vertical height of center post 18. The upper, unoccupied, portion of center post 18 telescopically receives the seat post 40. Spot welds 50 rigidly secure plate 20 to center post 18.

A pair of upwardly diverging edges 52A, 52B at an upper portion 54 of rigid plate 20 provide a V shaped notch 52 about 2-3 inches long in upper portion 54. The purpose of this notch is to provide lateral compression means for allowing the upper portion 54 to laterally compress. This is provided to reduce a localized concentration of stress in center post 18 at the terminal portion of plate 20.

Spring plate assembly 24 is attached at one end to front frame member 16 by front fitting 58 and to rear frame 14 by a fitting 62, which is similar to fitting 58 and which is welded to and projects forwardly from vertical center post 18. Like front frame fitting 58, it is oriented such that its major dimension is generally horizontal. A plurality of clamping screws 60 frictionally retain the spring plate assembly 24 in its respective front and rear fittings 58 and 62.

Figure 10:
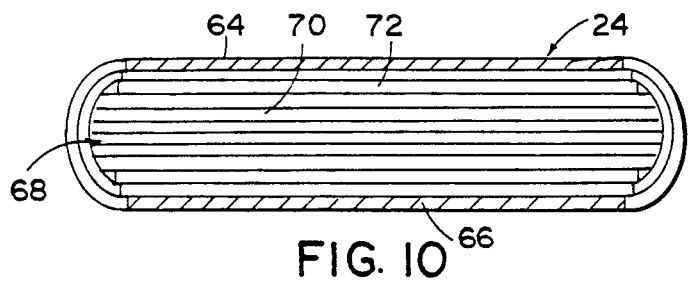
FIG. 10 is a cross-sectional view taken along the lines X—X in FIG. 9.

Referring to FIG. 10, spring plate assembly 24 has a laminate construction comprising a top plate 64, a bottom plate 66 and a laminate core 68 between the top and bottom plates 64, 66 respectfully. The top and bottom plates 64, 66 are made from spring steel that, in the most preferred embodiment is 42 mils in thickness. Core 68 is manufactured from multiple parallel layers 70 of a fiber glass mat bonded together by a polyester resents. A double layer 72 of a polymeric material is bonded to each side of the fiberglass laminate between core 68 and its respective plate 64, 66. The polymeric layer 74 may be applied by making two raps of a polymeric sheet transverse the longitudinal axis of the spring plate 56. A polymeric material suitable for this application is manufactured under the brand KEVLAR by Dupont. Also, spring plate assembly 24 can be made of a second material which can be purchased in preformed and precured strips, the second material being Scotch Ply, stock number 1002, strips FP534 supplied by 3M Company. This second material is then cut and sanded to an appropriate shape for use.

Changes and modifications in the specifically described embodiment can be carried out without departing from the scope of the invention. The invention, although capable of implementation in many forms, is intended to be limited only by the scope of the appended claims and al equivalents to which we are entitled as a matter of law.

The embodiments of the invention in which an exclusive property or privilege is claimed are defined as follows:

1. An improved bicycle having a frame, a pair of wheels supporting said frame, and a pedal crankshaft journaled to said frame for propelling one of said wheels, said frame including:
   a rear frame member including a generally vertical center post positioned within an imaginary, generally vertical plane extending along a longitudinal axis of said bicycle;
   a front frame member including a generally horizontal crossbar positioned within said generally vertical, longitudinal plane;
   flex means for flexibly interconnecting said frame members so as to allow vertical relative flexing of said frame members generally along said generally vertical, longitudinal plane and to minimize relative flexing of said frame members out of said generally vertical, longitudinal plane;
   said crossbar comprising a single, horizontally extending hollow tubular member having a length with a generally elliptical cross-section and axis and major axis which is oriented in said imaginary generally vertical plane for a major portion of the length of said crossbar, for minimizing twisting of said crossbar, said hollow tubular member receiving said flex means at a rearward end thereof;
   said flex means comprising a generally flat spring having a horizontally oblong lateral cross-section;
   said tubular member tapering into a generally triangularly-shaped cross-section thus defining a transition area near said rearward end of said tubular member and adjacent said flex means; and
   said triangularly-shaped cross-section abruptly necking into an opening having a second major axis generally perpendicular to said first major axis and similarly shaped in lateral cross-section to said generally flat spring and defining a fitting receiving said generally flat spring.

2. The bicycle of claim 1 which includes a spring biased cable extending from said rear frame member near a bottom thereof to said front frame member; and said crossbar includes means to attach said cable located adjacent a forward end of said crossbar.

3. The bicycle of claim 1 wherein said front frame member includes an adjoining portion and wherein the width of said elliptical cross-section of said crossbar is equal to the width of the adjoining portion of said front frame member.

4. The bicycle of claim 1 wherein said crossbar is made of chrome alloy high strength steel having a thickness of about 35 thousandths of an inch.

5. A bicycle frame comprising:
   a rear frame member including a generally vertical center post positioned within an imaginary, generally vertical plane extending along a longitudinal axis of said bicycle;
   a front frame member including a generally horizontal crossbar positioned within said generally vertical, longitudinal plane;
   flex means for flexibly interconnecting said frame members so as to allow vertical relative flexing of said frame members generally along said generally vertical, longitudinal plane and to minimize relative flexing of said frame members out of said generally vertical, longitudinal plane;
   said crossbar comprising a single, horizontally extending hollow tubular member having a length with a generally elliptical cross-section and a first major axis which is oriented in said imaginary generally vertical plane for a major portion of the length of said crossbar, for minimizing twisting of said crossbar, said hollow tubular member receiving said flex means at a rearward end thereof;
   said flex means comprising a generally flat spring having a horizontally oblong lateral cross-section;
   said tubular member tapering into a generally triangularly-shaped cross-section thus defining a transition area near said rearward end of said tubular member and adjacent said flex means; and
   said triangularly-shaped cross-section abruptly necking into an opening having a second a major axis generally perpendicular to said first major axis and similarly shaped in lateral cross-section to said generally flat spring and defining a fitting receiving said generally flat spring.

6. The bicycle frame of claim 5 which includes a spring biased cable extending from said rear frame member near a bottom thereof, to said front frame member; and said crossbar includes means to attach said cable located adjacent said forward end of said crossbar.

7. The bicycle frame of claim 5 wherein said front frame member includes an adjoining portion and wherein the width of said elliptical cross-section of said crossbar is equal to the width of the adjoining portion of said front frame member.

8. The bicycle frame of claim 5 wherein said crossbar is made of chrome alloy high strength steel having a thickness of about 35 thousandths of an inch.

* * * * *